(12) United States Patent
Chertov et al.

(10) Patent No.: US 11,968,091 B1
(45) Date of Patent: Apr. 23, 2024

(54) DETECTING CONFIGURATION COLLISIONS BETWEEN MULTIPLE CONFIGURATION CLIENTS

(71) Applicant: Arista Networks, Inc., Santa Clara, CA (US)

(72) Inventors: Roman Olegovich Chertov, San Jose, CA (US); Sebastian Sapa, Vancouver (CA); Christopher Elisha Neilson, Vancouver (CA); Francois Guy Maurice Ripault, San Jose, CA (US); Ronan Mac Fhlannchadha, Dublin (IE)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/157,499

(22) Filed: Jan. 20, 2023

(51) Int. Cl.
*H04L 41/0869* (2022.01)
*H04L 41/0853* (2022.01)

(52) U.S. Cl.
CPC ...... *H04L 41/0869* (2013.01); *H04L 41/0856* (2013.01)

(58) Field of Classification Search
CPC ............. H04L 41/0659; H04L 41/0853; H04L 41/0856; H04L 41/0859; H04L 41/0869
See application file for complete search history.

(56) References Cited

U.S. PATENT DOCUMENTS

| | | | | |
|---|---|---|---|---|
| 2007/0266232 A1* | 11/2007 | Rodgers | ............ | G06F 21/10 713/150 |
| 2009/0210768 A1* | 8/2009 | Carlson | ............ | G06F 13/385 714/E11.044 |
| 2011/0010383 A1* | 1/2011 | Thompson | ............ | H04L 41/085 709/227 |
| 2017/0323633 A1* | 11/2017 | Lawrenson | ............ | G10L 25/90 |
| 2021/0026786 A1* | 1/2021 | Meier | ............ | G11C 11/1695 |
| 2021/0028980 A1* | 1/2021 | R | ............ | H04L 41/0816 |
| 2022/0391662 A1* | 12/2022 | Sawal | ............ | G06N 3/088 |
| 2023/0006881 A1* | 1/2023 | Krishnamurthy | ............ | H04L 41/22 |

\* cited by examiner

*Primary Examiner* — Douglas B Blair
(74) *Attorney, Agent, or Firm* — Sprinkle IP Law Group

(57) ABSTRACT

Methods and apparatus for enabling detection of configuration changes in a network device. One method uses a configuration counter in a system database of the network device. In response to an atomic submission of CLI commands to a configuration agent and the storing of the corresponding configuration in a system database, the configuration counter is incremented. An OpenConfig module maintains an expected value of the configuration counter and, upon completion of its own command submissions, compares the expected value to the value in the configuration counter. If the two values do not match, it indicates that the configuration counter in the system database has been incremented as a result of a configuration change from a source other than the OpenConfig module. A configuration client can then be notified of the configuration change so that it can revert the configuration to a desired configuration.

20 Claims, 7 Drawing Sheets

DETECTING CONFIGURATION COLLISIONS BETWEEN MULTIPLE CONFIGURATION CLIENTS

TECHNICAL FIELD

The invention relates generally to network device configuration, and more particularly to systems, methods and products for detecting changes to a network switch configuration and alerting a client (e.g., the switch owner) to the change so that the configuration can be reset to a desired configuration.

BACKGROUND

Network switches can be configured using various means. A number of vendors use open source network management protocols (such as those defined by OpenConfig) for the configuration of their network switches. The use of these network management protocols allows network switches to be configured using OpenConfig or various other configuration sources. This presents the problem that the configuration of a network switch as set by the switch owner may be changed by another entity.

Currently, in order for a switch owner to ensure that its network switch is configured as desired, it is necessary for the switch owner to repeatedly check the configuration of the switch to determine whether any changes have been made by other entities. This is accomplished by retrieving the configuration of the switch and comparing this configuration to an expected configuration (the desired configuration set by the switch owner) to identify any changes from the desired configuration. If any changes are detected, the switch owner then reverts the configuration to the desired configuration. This process is repeated at regular intervals (e.g., every 5 seconds). This repeated checking of the switch configuration (which is performed whether there have been any undesired changes or not) consumes an enormous amount of resources.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
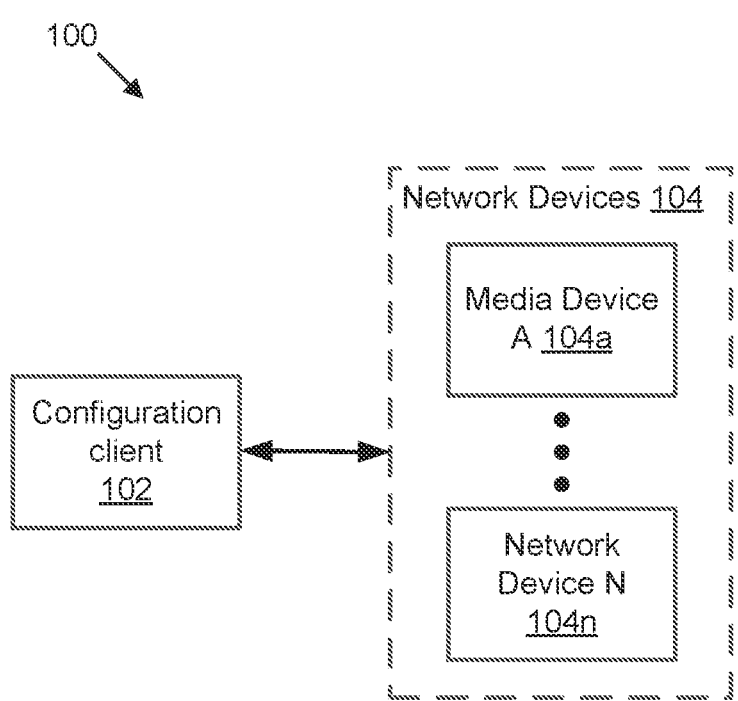
FIG. 1 is a block diagram illustrating a system including a configuration client and a set of network switches in accordance with the prior art.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of the invention solve the foregoing problems of existing systems by implementing a mechanism to provide notifications to the switch owner which are triggered by changes to the switch configuration. In some embodiments, the notifications are triggered only by changes made by a source other than the switch owner, while other embodiments are triggered by any changes to the configuration, including changes by the switch owner.

The notifications are achieved by adding a config node in the Yang tree of the switch that generates an on-change notification, where the node is updated in response to either of two conditions. In some embodiments, the node is updated in response to a message from a system database indicating that a pending configuration session has been completed. In other embodiments, the node is updated in response to any message from the system database indicating that a change has been made to the switch configuration (regardless of whether or not a configuration session has been completed).

The switch owner subscribes to the added on-change node in the Yang tree so that when the node is updated (in response to either completion of a configuration session or any change to the configuration, depending upon the particular implementation), the switch owner is notified that there has been a change to the configuration of the switch. Then, in response to the notification, the switch owner can identify and reset the configuration of the switch to a desired or expected configuration.

In some embodiments, the notification to the switch owner may identify the specific change that was made to the configuration. Alternatively, the change can be identified by retrieving the entire configuration of the switch and comparing it to an expected configuration to determine differences between the retrieved configuration and the expected configuration.

Because the switch owner is notified of configuration changes when they are made, the switch owner does not have to repeatedly retrieve the current switch configuration at very short intervals and compare the retrieved configuration to the expected configuration to determine whether any changes to the configuration have been made. By eliminating the repeated (e.g., every five seconds) downloads of the configuration and the comparisons to the expected configuration, an enormous amount of processing resources are saved.

Figure 2:
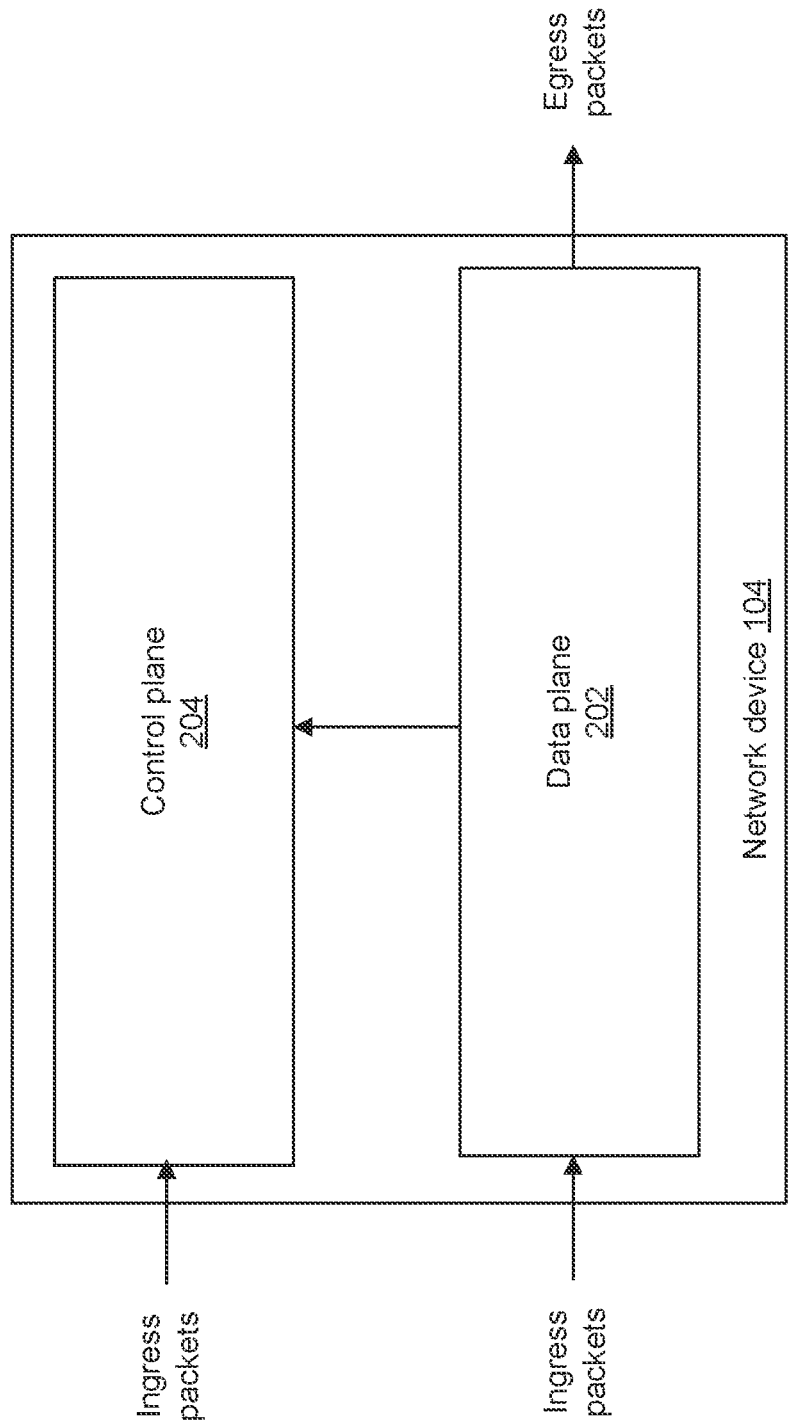
FIG. 2 is a block diagram illustrating the control and data planes of a network switch in accordance with some embodiments.
Figure 3:
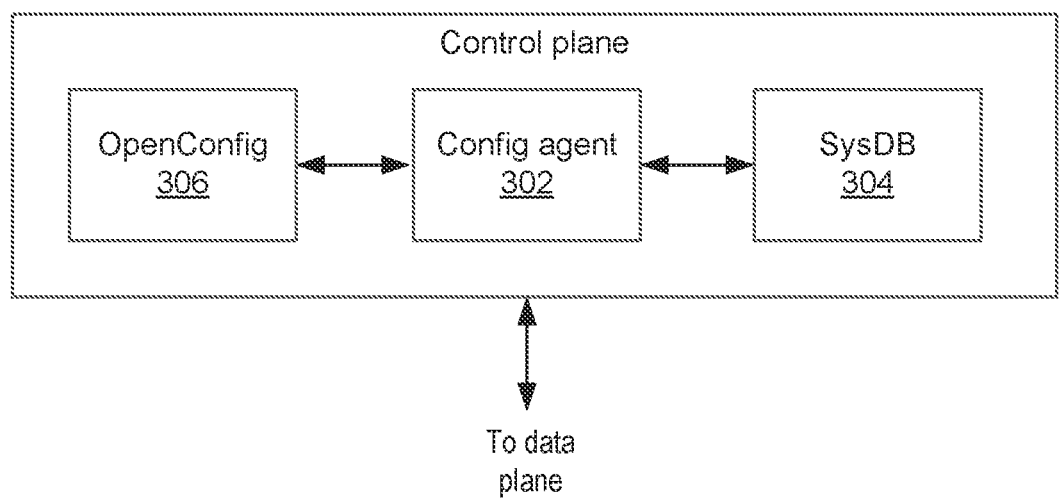
FIG. 3 is a block diagram illustrating a configuration agent and system database in the control plane of a network switch in accordance with some embodiments.

FIGS. 1-3 show some of the relevant components of an exemplary system for detecting configuration changes in a network software and notifying a configuration client of the changes. FIG. 1 shows a system including a configuration client and a set of network switches. FIG. 2 shows the control and data planes of a network switch. FIG. 3 shows the configuration agent and system database in the control plane of the network switch.

Referring to FIG. 1, a system in accordance with one or more embodiments of the invention is shown. System 100 includes a network configuration client 102 and one or more network devices 104. These components may be directly or indirectly connected to each other using any combination of wired or wireless connections. In embodiments in which the components are indirectly connected to one another, there may be other network elements (or systems) that facilitate communication between the components. The components may communicate with each other using any combination of wired and/or wireless communication protocols. These components are described in more detail below.

It should be noted that different instances of the same or similar devices may be identified herein by a common reference number followed by a letter. For instance, as depicted in FIG. 1, this system includes media devices 104a-104n. The individual media devices may be referred to collectively by the number alone (e.g., media devices 104).

In one embodiment of the invention, a network device 104 is a physical device that includes persistent storage, memory (e.g., Random Access Memory, or RAM), one or more processors (including a switch chip), and two or more physical ports. In one or more embodiments of the invention, the switch chip is hardware that determines which egress port of a switch is used to forward media access (MAC) frames. The switch chip may also include ingress ports at which MAC frames are received to be forwarded via an appropriate egress port to another network device. Each port may or may not be connected to another device on a network, such as a server, a switch, a router, etc. The network device may be configured to receive packets via the ports and determine whether to (i) drop the packet, (ii) process the packet in accordance with one or more embodiments of the invention, and/or (iii) send the packet, based on the processing, out another port of the network element.

The persistent storage in the network element may include any type of non-transitory computer readable medium capable of storing instructions which, when executed by one or more processors in the network device, enable the network device to perform the functions of the device (as will be described below in accordance with example embodiments of the invention).

In some embodiments, configuration client 102 may be a software application executing on a client device. The client device can include any type of computing system that is configured to interact with network devices 104. For example, the client device may be a desktop computer operated by a network administrator. In this example, the network administrator may have configured the network devices to receive information or commands that are used to configure the network devices.

FIG. 2 shows a network device in accordance with some embodiments. Network device 104 includes a data plane 202 and a control plane 204. The data plane includes functionality to receive packets (which may be referred to as ingress packets) via ingress ports of the device. The network device processes the packets and transmits the packets, as appropriate, via the egress ports towards a destination. The transmitted packets may be referred to as egress packets. Data plane 202 also functions to gather data plane information and to provide this data plane information to control plane 204. Data plane information may include, for example, network usage data, data flow information based on the sampling of packets received by the network device, information related to queue depths on ingress and egress buffers in the data plane, and other data traffic statistics.

Control plane 204 includes functionality to manage the overall operation of the network device, including functionality to manage the operation of the data plane (e.g., programming the forwarding table). The control plane may also include functionality to receive and respond to commands that are used to configure the network device. Configuration information for the network device is stored in a system database (SysDB) in control plane 204, and the configuration information is used to control the operation of the network device, particularly with respect to the processing of received packets.

FIG. 3 shows the control plane 204 of an example network device in accordance with some embodiments. Control plane 204 includes a configuration agent 302, a system database (SysDB) 304 and a configuration module (OpenConfig) 306.

Configuration agent 302 implements one or more protocols, processes, and/or services of the network device. In particular, configuration agent 302 exposes an API to an OpenConfig module 306 for communication of configuration commands from OpenConfig to the configuration agent and returns API responses to OpenConfig responsive to the configuration commands. Configuration agent 302 also forwards corresponding configuration information to SysDB 304 to be stored in the network device configuration.

SysDB 304 may be implemented using any combination of shared and non-shared memory. SysDB 304 stores the current configuration of the network device, such as the values in the data structures used by any of the agents in the network device. SysDB 304 also stores values of variables and/or parameters that are currently specified in the network element. For example, the SysDB may include the current routing table entries as determined by the routing information base agent.

The specific content of the records in the SysDB may vary based on its specific implementation in the network device. A typical record within the SysDB may include, for example, the name of a variable or parameter, the current value of the variable or parameter, and a timestamp indicating when the record was created (or was last modified). While the SysDB shown in FIG. 3 is shown as a single unit, embodiments may use implement portions of the SysDB in distributed units in different locations within the network device.

Configuration agent 302 includes functionality to access various portions of SysDB 304 in order to obtain the relevant portions of the configuration of the network device in order to perform updates to the configuration and to control the various functions of the network device. Configuration agent 302 includes functionality to: obtain the state of the network element and any updates to the state of the network element, obtain traffic statistics and/or other information from the data plane, and provide the information obtained to one or more target entities (e.g., third party devices, virtual machines executing on third party devices, etc.).

OpenConfig module 306 is a configuration module that implements a consistent set of vendor-neutral data models in the form of a Yang tree. This configuration module provides a programmatic interface and tools for a configuration client to manage the network device in a dynamic, vendor-neutral manner. While embodiments discussed herein use the data models developed by the OpenConfig working group, alternative embodiments may implement other data models. Accordingly, the use of the term "OpenConfig" herein should be construed as illustrative, rather than limiting.

Figure 4:
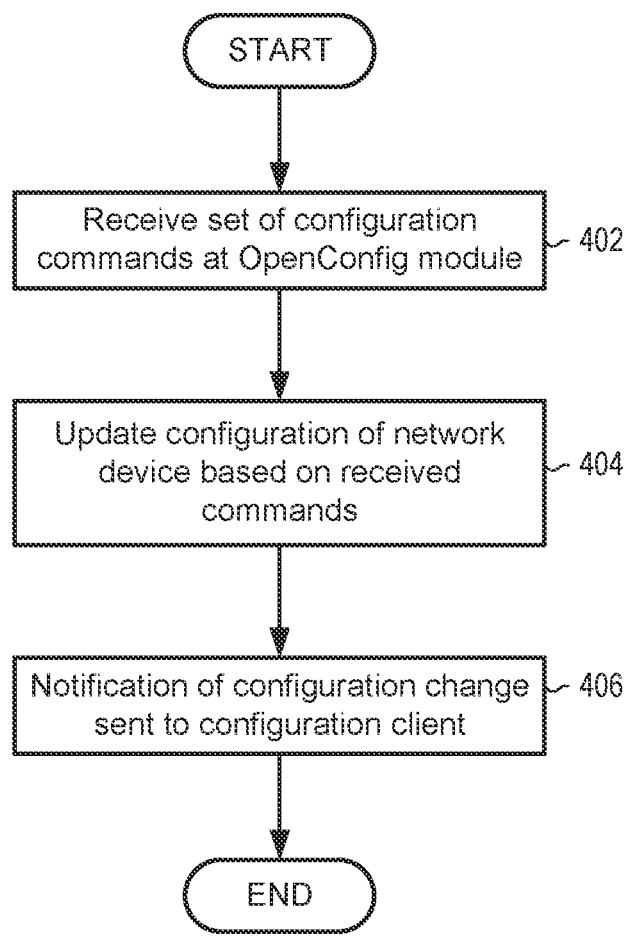
FIG. 4 is a flow diagram illustrating a method for notifying a configuration client when changes have been made to the configuration of a network switch in accordance with some embodiments.

Referring to FIG. 4, a flow diagram illustrating a method in accordance with some embodiments is shown. The method depicts, at a high level, a method for notifying a configuration client when changes have been made to the configuration of a network switch. At step 402, a set of configuration commands are received by an OpenConfig module. The configuration commands may be contained in a gNMI Set command received from a configuration client. At step 404, the configuration of the network switch is updated according to the received commands. In some environments, this may comprise transmitting the configuration from the OpenConfig module to the configuration agent of the network switch, which in turn forwards the configuration to the SysDB of the network switch to be stored. The SysDB then sends notifications to the OpenConfig module to confirm that the configuration has been stored in the SysDB. At step 406, a notification of the changed configuration is transmitted from the OpenConfig module to the configuration client. This notification may be transmitted for any change In the switch configuration, or it may be transmitted only when certain conditions relating to the configuration change are met, as will be discussed in more detail below.

Figure 5:
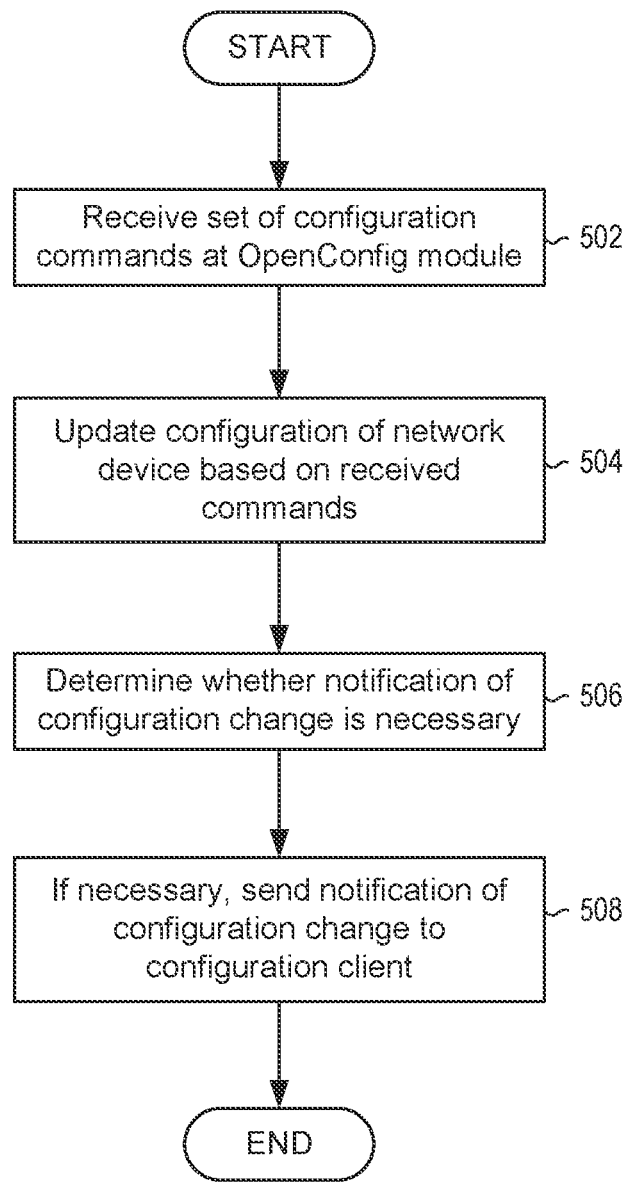
FIG. 5 is a flow diagram illustrating an alternative method for notifying a configuration client when changes have been made to the configuration of a network switch in accordance with some embodiments.

Referring to FIG. 5, a flow diagram illustrating an alternative method in accordance with some embodiments is shown. This method, similar to FIG. 4, shows at a high level, a method in which a configuration client is notified when changes have been made to the configuration of a network switch, but the notifications are not required for all changes in the configuration. At step 502 of this method, a set of configuration commands are received by an OpenConfig module. The configuration commands in this embodiment are contained in a gNMI Set command received from a configuration client. At step 504, the configuration of the network switch is updated according to the received commands. This may comprise transmitting the configuration from the OpenConfig module to the configuration agent of the network switch, forwarding the configuration from the configuration agent to the SysDB, and returning notifications from the SysDB to the OpenConfig module to confirm that the configuration has been stored in the SysDB. At step 506, the OpenConfig module determines whether the configuration update requires a notification to be sent to the configuration client. This may comprise checking a counter in the OpenConfig module to determine whether the configuration change was expected, checking to determine whether changes have been made to configuration nodes (as opposed to status nodes), or various other conditions which will be described in more detail below. At step 508, if necessary, the OpenConfig module transmits a notification of the changed configuration to the configuration client.

Figure 6:
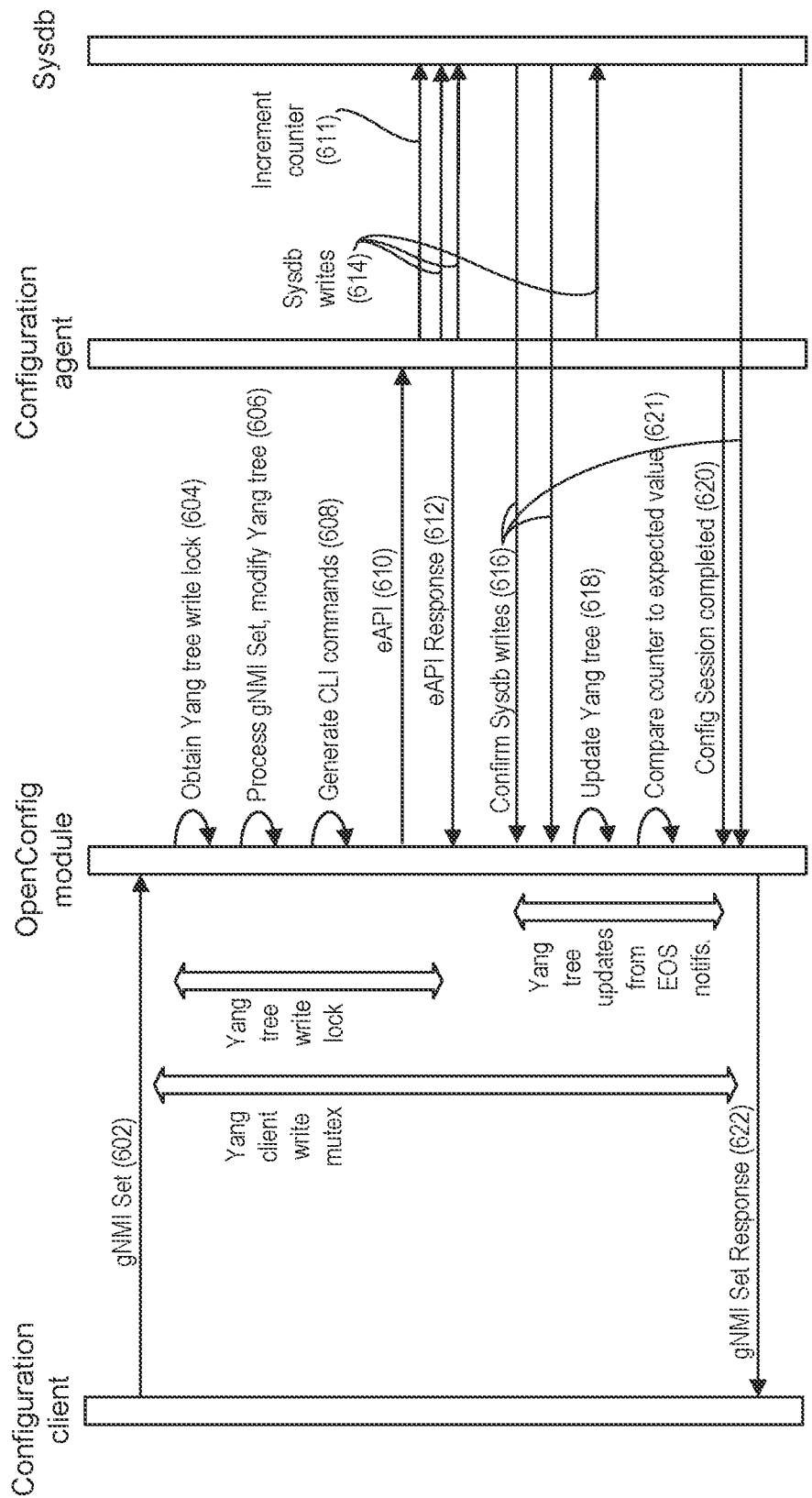
FIG. 6 is a transaction diagram illustrating a typical process for configuration of a network device in accordance with some embodiments.

Referring to FIG. 6, a transaction diagram is shown to illustrate a typical process for configuration of a network device in accordance with some embodiments. FIG. 6 shows the communications between a configuration client, an OpenConfig module, a configuration agent, and a system database. In this figure, an OpenConfig module is used to manage the configuration of a network device that includes a configuration agent and a system database. A configuration client interacts with the OpenConfig module to set the configuration of the network device.

As depicted in FIG. 6, the configuration client first issues a gNMI set command to the OpenConfig module (602). When the OpenConfig module receives the gNMI set command, it obtains a write lock for a Yang tree that is maintained by the OpenConfig module (604). The Yang tree contains information representing the configuration of the network device. The OpenConfig module in this embodiment only allows one set session (configuration session) at a time.

After the write lock has been obtained for the Yang tree, the OpenConfig module may begin processing the gNMI set command and modifying the getting tree based on the gNMI set (606). Based on the modifications to the Yang tree, the OpenConfig module generates a corresponding set of command line interface (CLI) commands (608). The CLI commands that are generated by the OpenConfig module are sent to the configuration agent of the network device via a corresponding API (610). After the OpenConfig module sends the CLI commands to the configuration agent, the OpenConfig module receives a confirmation of receipt of the commands from the configuration agent (612) and then waits for a response.

When the configuration agent of the network device receives the CLI commands from the OpenConfig module (610), it increments a counter (which may be referred to herein as a configuration counter) in the system database to indicate that the configuration of the network device is being updated (611). The counter is incremented once for the configuration session (which corresponds to the gNMI set command and the group of CLI that are generated by the configuration agent as a result of the gNMI set and which are applied atomically to the system database). If an individual configuration command is received from a source other than the OpenConfig module (e.g., if a CLI command bypasses the OpenConfig module and is provided directly to the configuration agent), the configuration counter is likewise incremented for this atomically applied CLI command.

Within the configuration session corresponding to the set command, the configuration agent writes the configuration corresponding to each of the CLI commands received from the OpenConfig module to the system database of the network device (614). (Similarly, individual CLI commands received from other sources are written to the system database after the corresponding incrementing of the configuration counter.) As the configuration is written to the system database, the system database confirms the configuration writes and sends notifications to the OpenConfig module confirming that the corresponding configuration has been written to the system database (616). As the notifications are received from the system database confirming the configuration information has been written to the system database, the OpenConfig module updates the Yang tree to reflect the confirmed configuration (618).

It should be noted that, although the configuration changes are pushed atomically from the OpenConfig module to the configuration agent, the writes to the system database and corresponding acknowledgements of the writes are streaming. As a write is completed, it is acknowledged with a corresponding notification from the system database to the OpenConfig module. Consequently, the writes are often not all completed before the system database acknowledgements begin to be returned. The writes and acknowledgements are therefore commonly interspersed.

It should also be noted that although the incrementing of the configuration counter is depicted in FIG. 6 as occurring before the writes to the system database, the counter may be incremented at any time during the configuration session.

When all of the configuration contained in the CLI commands from the OpenConfig module have been written to the system database, the configuration session has been completed, and a corresponding notification is sent from the configuration agent to the OpenConfig module (620). After the OpenConfig module has received this notification that the configuration session has been completed, it checks the value of the system database's configuration counter to compare this value to an expected value (621) and sends a gNMI set response to the configuration client (622).

Referring again to transaction 621, the OpenConfig module compares the value of the configuration counter in the system database to an expected value that is maintained by the OpenConfig module. This embodiment is implemented in a scenario in which a client (e.g., network device owner) wishes to maintain control over the configuration of the network device through the OpenConfig module. The client does not want alternative sources to change the configuration of the device by, for example, sending individual CLI commands directly to the configuration agent, bypassing the configuration client and the OpenConfig module.

This embodiment detects out-of-band changes (changes other than those made by the configuration client through the OpenConfig module) via the check of the configuration counter value. More specifically, the OpenConfig module tracks an expected value and compares this value with the value in the system database's configuration counter. If the configuration counter value received from the system database is the same as the expected value maintained by the OpenConfig module, then it is determined that only the OpenConfig module has changed the device configuration and there have been no out-of-band changes to the configuration.

If, on the other hand, the configuration counter value received from the system database is different than the expected value maintained by the OpenConfig module, then it is determined that there have been one or more out-of-band changes to the device configuration in addition to the change(s) made via the OpenConfig module. In response to determining that there have been out-of-band changes to the device configuration, the OpenConfig module can provide a notification to the configuration client of these changes so that the client can reset the configuration to a desired/expected state.

The use of a counter in this manner is preferable to, for example, a Boolean indicator or flag because such a flag can indicate that the configuration has been changed, but it is difficult to know whether the configuration was changed by the configuration client or some other source. With the counter, the OpenConfig module knows the specific value that will be stored in the counter as a result of the configuration client's changes, so if the counter has a different value, it is clear that another source has changed the configuration.

The notification to the configuration client may be provided in a number of different ways. In one embodiment, the OpenConfig module, upon determining that the configuration counter does not match the expected value, updates a particular node in the Yang tree corresponding to the device configuration. This node is an "on-change" node that is added to the Yang tree. When a change is made to the node, a client that is subscribed to the node automatically receives a notification of the change. Thus, when the OpenConfig module determines that the system database's configuration counter value does not match the value expected by the OpenConfig module, the OpenConfig module simply makes a change to the new on-change node in the Yang tree, and the subscribed configuration client receives a notification, making it aware that the device configuration has been changed by an out-of-band source.

As an example of this process, consider a scenario in which a configuration client updates the configuration of a network device through an OpenConfig module, and no other sources attempt to make out-of-band changes to the configuration of the device. The system begins in a steady state (there are no pending configuration commands, including gNMI set commands), and the expected counter value stored at the OpenConfig module matches the internal configuration counter of the network device. In this example, the internal configuration counter stored in the system database has a value of 42, and the OpenConfig module likewise stores an expected value of 42.

The OpenConfig module receives a gNMI set from the configuration client, processes the gNMI set to generate a corresponding set of CLI commands and submits these commands atomically to the configuration agent. The configuration agent writes the corresponding configuration to the system database and updates the configuration counter in the system database to increment its value to 43. The system database issues notifications to the OpenConfig module to confirm the writes and, when the configuration session ends, the counter value of 43 is provided to the OpenConfig module.

Because the configuration session corresponding to the gNMI set has been completed, the OpenConfig module expects that the system database's configuration counter will have been incremented by 1 from its previous value of 42. The OpenConfig module compares the expected value (42+1) to the received counter value (43) and, since the values match, the OpenConfig module determines that there have been no out-of-band changes to the configuration of the new device. In some embodiments, the OpenConfig module updates a node in the Yang tree (a last-configuration-mechanism leaf) to indicate that the configuration was updated via gNMI. The OpenConfig module may also update a last-configuration-time leaf node in the Yang tree to indicate the time at which the configuration counter was changed.

In another example, consider the same system, where the configuration client updates the configuration of a network device through the OpenConfig module, but in this scenario another source (or potentially multiple other sources) attempts to make out-of-band changes to the configuration of the device. The system again begins in a steady state and the expected counter value stored at the OpenConfig module matches the internal configuration counter of the network device (e.g., both values may be 42).

The configuration client again sends a gNMI set to the OpenConfig module. The OpenConfig module processes the gNMI set to generate corresponding CLI commands which are submitted atomically to the configuration agent. The configuration agent writes the corresponding configuration to the system database and updates the configuration counter in the system database to increment its value.

As noted above, one or more other sources also change the network device's configuration in this scenario. One of the out-of-band changes made by these other sources may, for example, be made by issuing a CLI command to the configuration agent, bypassing the OpenConfig module. In this example, the out-of-band change is made to the configuration before the changes corresponding to the gNMI set are submitted to the configuration agent. Because the configuration agent increments the configuration counter stored in the system database each time a configuration change is written to the system database, the counter is incremented when the out-of-band change is written to the system database.

It should be noted that the configuration counter is incremented once for each configuration change or set of changes that is atomically submitted to the configuration agent to be written to the system database. Thus, the counter is incremented only once for the set of CLI commands that are atomically submitted to the configuration agent by the OpenConfig module. The counter is also incremented once for the individually submitted CLI command submitted to the configuration agent by the other source.

As the CLI commands (both from the configuration client's gNMI set and the out-of-band source) are written to the system database, the system database sends notifications to the OpenConfig module to confirm the writes. When the configuration session ends, the counter value is provided to the OpenConfig module.

Since the expected value maintained by the OpenConfig module at the beginning of the configuration session corresponding to the received gNMI set command was 42, and since the OpenConfig module is only aware of the configuration changes corresponding to the gNMI set, the OpenConfig module expects that the value of the system database's configuration counter will only have been incremented by 1. Thus, the OpenConfig module expects the configuration counter to have a value of 43 at the end of the configuration session.

Because the configuration counter has actually been incremented once for the gNMI set configuration session and once for the out-of-band CLI command, however, the configuration counter value is actually 44. Consequently, when the OpenConfig module compares the expected value (43) to the received counter value (44) and, since the values don't match, the OpenConfig module therefore determines that there have been out-of-band changes to the configuration of the new device and provides appropriate notification to the configuration client. The configuration client may receive this notification by using a type of Get command that is an on-change subscription, so that when a change is made to a specified path, a notification is provided to the configuration client. In one embodiment, the configuration client subscribes to an on-change node which has been added to the Yang tree and which is updated when the device configuration is changed.

It should be noted that, if a configuration change occurs, a notification is sent to the OpenConfig module. Upon receiving the notification, the OpenConfig module determines whether a configuration session corresponding to a gNMI set is in progress. If not, the OpenConfig module updates the last-configuration-mechanism node to indicate that the configuration was updated via CLI and also updates the last-configuration-time leaf node in the Yang tree to indicate the time at which the configuration counter was changed.

In response to receiving a notification that the configuration of the network device has changed, the configuration client can initiate a gNMI set to revert the configuration of the device back to the expected configuration. In some embodiments, the configuration client first retrieves a snapshot of the device configuration, then compares this snapshot to an expected configuration to determine differences between the snapshot and the expected configuration, and then generates a gNMI set to reset the differences to the corresponding expected values and states.

There may be a number of variations in alternative embodiments. In the embodiment above, the added on-change Yang tree node is separate from the counter which is maintained by the OpenConfig module. This allows the OpenConfig module to limit the notifications to the configuration client (e.g., only provide notifications when the configuration counter indicates that another source has changed the device's configuration). In another embodiment, the OpenConfig-maintained counter and the on-change node could be coincident, in which case the configuration client would be notified of any changes to the device configuration, including the changes made at the configuration client's request.

One alternative embodiment uses a configuration time node rather than a configuration counter as the basis for providing notifications to the configuration client. In this embodiment, a configuration client again updates the configuration of the network device by sending configuration changes (e.g., in a gNMI set command) to the OpenConfig module, the OpenConfig module generates corresponding CLI commands that are atomically submitted to the configuration agent, and the configuration commands are written to the system database. The system database then provides notifications to the configuration agent confirming that the configuration has been written to the system database. The following actions differ somewhat from the previously described embodiments.

Figure 7:
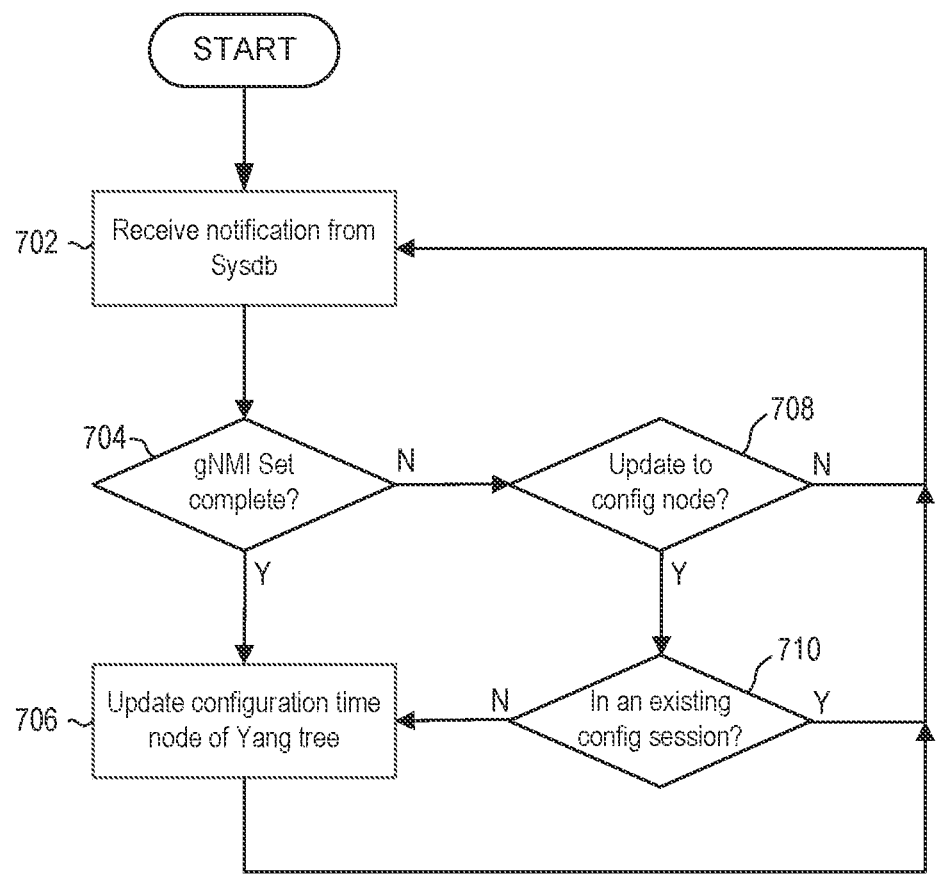
FIG. 7 is a flow diagram illustrating an alternative method for notifying a configuration client when changes have been made to the configuration of a network switch in accordance with some embodiments.

Referring to FIG. 7, a notification is received by the OpenConfig module from the system database (702). If there is an existing configuration session, the notification may indicate completion of a configuration session. If the notification indicates at 704 that the configuration session is complete, the OpenConfig module updates a configuration time node of the Yang tree (706). The configuration time node is an on-change node to which the configuration client is subscribed, so the configuration client is notified of the update to the configuration time.

If the notification received by the OpenConfig module indicates at 704 a configuration change rather than completion of a configuration session, the OpenConfig module determines at 708 whether the configuration change corresponds to a configuration node or a state node in the Yang tree. If the notification does not correspond to a configuration node, the OpenConfig module simply continues to 702, and waits for another notification.

If the notification corresponds to a configuration node, the OpenConfig module determines whether it is in an existing configuration session (710). If it is in an existing configuration session, the notification may have been generated in the normal course of the configuration session, so the OpenConfig module continues to 702, and waits for another notification. The configuration time node of the Yang tree is not updated at this point because there may be hundreds or thousands of configuration changes associated with the configuration session, and it would not be desirable to update the configuration time node for each separate notification, as this could potentially flood the configuration client with resulting notifications of updaters to the on-change configuration time node.

If the OpenConfig module is not in an existing configuration session, the notification indicates that the configuration was changed by a source other than the configuration client, so it updates the configuration time node of the Yang tree (706). Upon updating the configuration time node, the configuration client is notified of the update, so the configuration client is immediately made aware of the configuration change made by a source other than the configuration client.

Thus, in this embodiment, the configuration client receives a notification that the configuration of the device has changed, whether the change is made by the configuration client itself, or another source. Alternatively, the OpenConfig module could be configured to update the configuration time node only when the configuration is updated outside a configuration session, so that the configuration client is only notified when the configuration is changed by a source other than the configuration client.

It should also be noted that the same mechanism could be implemented using an on-change node other than a configuration time node. For example, a counter could be used, as in the previous embodiments, or the node could store any other value (e.g., a random number). The updating of the node by the OpenConfig module would still provide a notification to the configuration client, making it aware of a configuration change. In some embodiments, the OpenConfig module could provide additional useful information to the configuration client via the on-change node, such as an identifier of a configuration item that has been changed, or an identifier of the source that originated the configuration change.

Another example embodiment is a method for enabling detection of configuration changes in a network device. This method includes maintaining a configuration counter in a system database of a network device and receiving by a configuration agent of the network device a plurality of sets of configuration commands, where each set of configuration commands is atomically submitted to the configuration agent. For each set of configuration commands, one or more corresponding configuration changes are stored in the system database, the configuration counter is incremented, and a value of the configuration counter is returned to the configuration agent.

In some embodiments, a first subset of the multiple sets of configuration commands is received from an OpenConfig module of the network device and a second subset of the multiple sets of configuration commands is received from a source other than the OpenConfig module. The value of the configuration counter may be returned to the OpenConfig module, which maintains a second counter, where the value of the second counter is compared to the value of the configuration counter to determine whether the value of the configuration counter has only been incremented once. In some embodiments, this is accomplished by determining whether the value of the configuration counter matches the value of the second counter.

Then, in response to determining that the value of the configuration counter has been incremented more than once, it is determined that a configuration change has been made by the source other than the OpenConfig module. In response to the configuration change, it is determined whether a notification is to be sent to a configuration client. After sending the notification to the configuration client, receiving one or more commands from the configuration client to reset a configuration of the network device to an expected state.

Another example embodiment comprises a network device capable of detecting configuration changes from sources other than a configuration client. The network device comprises an OpenConfig module, a configuration agent coupled to the OpenConfig module, and a system database coupled to the OpenConfig module and the configuration agent. The network device is configured to maintain a configuration counter in the system database. The configuration agent is configured to receive multiple sets of configuration commands, where each set of configuration commands is atomically submitted to the configuration agent. The configuration agent is further configured to, for each set of configuration commands, store one or more corresponding configuration changes in the system database, increment the configuration counter, and receive an incremented value of the configuration counter.

In some embodiments, a first subset of the plurality of sets of configuration commands is received from an OpenConfig module of the network device and a second subset of the plurality of sets of configuration commands is received from a source other than the OpenConfig module. The value of the configuration counter is returned to the OpenConfig module, which maintains an expected counter value, and the OpenConfig module compares the expected counter value to the value of the configuration counter to determine whether the value of the configuration counter matches the expected counter value. The OpenConfig module may be configured to determine that a configuration change has been made by the source other than the OpenConfig module in response to determining that the value of the configuration counter does not match the expected counter value. The OpenConfig module may also be configured to determine whether, in response to the configuration change, a notification is to be sent to a configuration client.

In another example embodiment, a method for detecting configuration changes in a network device comprises monitoring configuration information stored in a system database of a network device using an OpenConfig module. Changes which have been made to entries in the system database are then detected and it is determined whether the changes to the database entries include changes to configuration items. In response to determining that the changes to the database entries include configuration changes, a notification is sent to a configuration client.

The method may include receiving one or more configuration commands from the configuration client which revert the configuration information to an expected state. Monitoring the configuration information may comprise receiving responses from the system database, where each of the responses corresponds to one of the changed database entries. The method may also include, for each of the responses, updating a corresponding node in a Yang tree maintained by the OpenConfig module, where determining whether the changes to the one or more database entries include changes to configuration items comprises determining whether any of the changed nodes of the Yang tree are configuration nodes.

In some embodiments, prior to the monitoring, the OpenConfig module: receives a configuration set command from a configuration client that defines changes to one or more aspects of a configuration of the network device; and opens a set session responsive to receiving the set command. After the set session has been opened, the system database is monitored for a message indicating completion of the set session, and responsive to receiving the message, the set session is closed, a local counter is incremented, and a last-configuration node of the Yang tree is marked to indicate the OpenConfig module.

The method may include incrementing a local counter and marking a last-configuration node of the Yang tree to indicate the CLI when a response is received indicating a changed database entry resulting from a command line interface (CLI). In some embodiments, sending a notification to the configuration client in response to determining that the changes to the database entries include configuration changes comprises adding an on-change config node to a Yang tree of the network device and updating the on-change config node in response to determining that the changes to the database entries include configuration changes, where the configuration client is subscribed to the on-change config node.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method for enabling detection of configuration changes in a network device, the method comprising:
    maintaining a configuration counter in a system database of a network device;
    receiving, by a configuration agent of the network device, a plurality of sets of configuration commands, each set of configuration commands being atomically submitted to the configuration agent; and
    for each set of configuration commands,
        storing one or more corresponding configuration changes in the system database, incrementing the configuration counter, and
        returning to the configuration agent a value of the configuration counter.

2. The method of claim 1, wherein a first subset of the plurality of sets of configuration commands is received from a configuration module of the network device and a second subset of the plurality of sets of configuration commands is received from a source other than the configuration module.

3. The method of claim 2, wherein the value of the configuration counter is returned to the configuration module of the network device that maintains a second counter, the method further comprising comparing a value of the second counter to the value of the configuration counter to determine whether the value of the configuration counter has only been incremented once.

4. The method of claim 3, further comprising, in response to determining that the value of the configuration counter has been incremented more than once, determining that a configuration change has been made by the source other than the configuration module.

5. The method of claim 4, further comprising determining whether, in response to the configuration change in the system database, a notification is to be sent to a configuration client.

6. The method of claim 5, further comprising receiving, subsequent to sending the notification to the configuration client, one or more commands from the configuration client to reset a configuration of the network device to an expected state.

7. The method of claim 2, wherein the value of the configuration counter is returned to the configuration module of the network device that maintains a second counter, the method further comprising comparing a value of the second counter to the value of the configuration counter to determine whether the value of the configuration counter matches the value of the second counter.

8. The method of claim 7, in response to determining that the value of the configuration counter does not match the value of the second counter, determining that a configuration change has been made by the source other than the OpenConfig module.

9. The method of claim 1, further comprising receiving one or more responses from the system database, wherein each of the one or more responses corresponds to one of the configuration changes in the system database.

10. The method of claim 9, further comprising, for each of the one or more responses, updating a corresponding node in a Yang tree maintained by a configuration module, wherein determining whether the changes to the one or more database entries include changes to configuration items comprises determining whether any of the changed nodes of the Yang tree are configuration nodes.

11. The method of claim 1, wherein the plurality of sets of configuration commands are included in a configuration set command from a configuration client, the configuration set command defining changes to one or more aspects of a configuration of the network device, and
    opening, by a configuration module, a set session responsive to receiving the set command;
    after the set session has been opened, monitoring the system database for a message indicating completion of the set session; and
    responsive to receiving the message indicating completion of the set session, closing the set session, incrementing a local counter and marking a last-configuration node of the Yang tree to indicate that the configuration module made a last configuration change.

12. The method of claim 1, further comprising, when a response is received indicating a changed database entry resulting from a command line interface (CLI), incrementing a local counter and marking a last-configuration node of the Yang tree to indicate that a source other than the configuration module made a last configuration change.

13. A network device capable of detecting configuration changes from sources other than a configuration client, the network device comprising:
    one or more processors executing a configuration module and a configuration agent coupled to the configuration module;
    a system database coupled to the configuration module and the configuration agent;
    wherein the network device is configured to maintain a configuration counter in the system database;
    wherein the configuration agent is configured to receive a plurality of sets of configuration commands, each set of configuration commands being atomically submitted to the configuration agent, the configuration agent further configured to, for each set of configuration commands,
        store one or more corresponding configuration changes in the system database, increment the configuration counter, and
        receive an incremented value of the configuration counter.

14. The network device of claim 13, wherein a first subset of the plurality of sets of configuration commands is received from the configuration module of the network device and a second subset of the plurality of sets of configuration commands is received from a source other than the configuration module.

15. The network device of claim 14, wherein the value of the configuration counter is returned to the configuration module, which maintains an expected counter value, the configuration module configured to compare the expected counter value to the value of the configuration counter to determine whether the value of the configuration counter matches the expected counter value.

16. The network device of claim 15, wherein the configuration module is configured to, in response to determining that the value of the configuration counter does not match the expected counter value, determine that a configuration change has been made by the source other than the configuration module.

17. The network device of claim 16, wherein the configuration module is further configured to determine whether, in response to the configuration change, a notification is to be sent to a configuration client.

18. The network device of claim 13, wherein the configuration module receives one or more responses from the system database, wherein each of the one or more responses corresponds to one of the configuration changes in the system database.

19. The network device of claim 18, wherein the configuration module is configured to, for each of the one or more responses, update a corresponding node in a Yang tree maintained by the configuration module, wherein the configuration module is configured to determine whether the changes to the one or more database entries include changes to configuration items by determining whether any of the changed nodes of the Yang tree are configuration nodes.

20. The network device of claim 13, wherein the plurality of sets of configuration commands are included in a configuration set command received from a configuration client, the configuration set command defining changes to one or more aspects of a configuration of the network device, and wherein the configuration module is configured to open a set session responsive to receiving the set command;

wherein after the set session has been opened, the configuration module is configured to monitor the system database for a message indicating completion of the set session; and wherein responsive to receiving the message indicating completion of the set session, the configuration module is configured to close the set session, increment a local counter and mark a last-configuration node of the Yang tree to indicate that the configuration module made a last configuration change.

* * * * *